Patented Nov. 29, 1932

1,889,732

UNITED STATES PATENT OFFICE

RICHARD STÜSSER, OF COLOGNE-DEUTZ, AND KARL WIEDEMANN, OF COLOGNE-MULHEIM, GERMANY, ASSIGNORS TO GENERAL ANILINE WORKS, INC., OF NEW YORK, N. Y., A CORPORATION OF DELAWARE

COPPER CONTAINING DISAZODYESTUFFS

No Drawing. Application filed March 6, 1931, Serial No. 520,639½, and in Germany March 11, 1930.

The present invention relates to a process of preparing copper compounds of disazodyestuffs and to the new copper containing azodyestuffs obtainable thereby, more particularly it relates to dyestuffs which may be represented by the probable general formula:

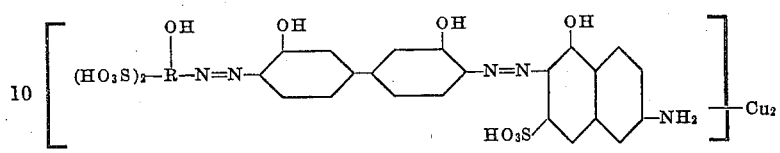

wherein R stands for a naphthalene nucleus in which the hydroxy group stands in o-position to the azo bridge, and wherein all nuclei may be further substituted for example, by halogen, alkyl, oxalkyl, alkyloxy, the nitro group, the sulfonic acid group, the carboxylic acid group, the hydroxy group and the amino group may be substituted by acyl or a hydrocarbon radical.

Our new copper containing azodyestuffs are obtained by heating in aqueous solution a water soluble salt of an azodyestuff of the general formula:

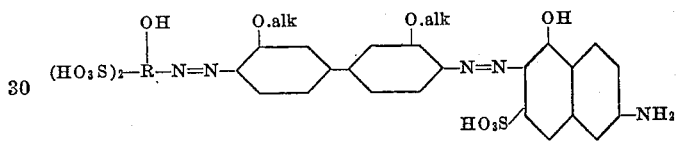

wherein R stands for a naphthalene nucleus, in which the hydroxy group stands in o-position to the azo bridge, "alk" stands for an alkyl group, such as methyl, ethyl or propyl, and wherein all nuclei may be further substituted for example, by halogen, alkyl, oxalkyl, alkyloxy, the nitro group, the sulfonic acid group, the carboxylic acid group, the hydroxy group and the amino group may be substituted by acyl or a hydrocarbon radical, with a compound of di-valent copper, yielding copper, such as cupric sulfate, cupric chloride, tetrammine cupric sulfate. The temperature at which our process can be carried out may be varied within the widest limits, say between about 60 and 175° C., and the reaction is complete when the shade of the dyestuff no longer changes which can be determined by taking test portions and dyeing cotton with these test portions.

Our new copper containing azodyestuffs are, in form of their alkali metal salts, generally dark powders, soluble in water with a blue coloration and dye cotton and viscose silk blue to violet shades of good fastness properties.

The invention is illustrated by the following examples, without being limited thereto:

*Example 1.*—244 parts by weight of 4.4'-diamino-3.3'-dimethoxydiphenyl are tetrazotized with 138 parts by weight of sodium nitrite and 800 parts by weight of hydrochloric acid (19½° Bé.), rendered alkaline with sodium bicarbonate and coupled with 304 parts by weight of 1-hydroxynaphthalene-3.6-disulfonic acid. After completion of the formation of the intermediate product the mixture is rendered alkaline by means of sodium carbonate and a solution, rendered alkaline by means of sodium carbonate, of 344 parts by weight of 2-(p-methoxyphenyl-amino)-5-hydroxynaphthalene-7-sulfonic acid in water is added. Then 200 parts by weight of sodium carbonate and 350 parts by weight of pyridine are added and stirring is continued for about 3 hours, until the shade no longer changes. The dyestuff is then salted out and filtered. One mol of the filtered dyestuff is dissolved in water, whereupon an aqueous solution of 500 parts by weight of copper sulfate is added, and the mixture is rendered acid to Congo by means of a little sulfuric acid, the solution is then heated in an autoclave at about 110-115° C. for about 20 hours. The dyestuff containing copper of the following formula:

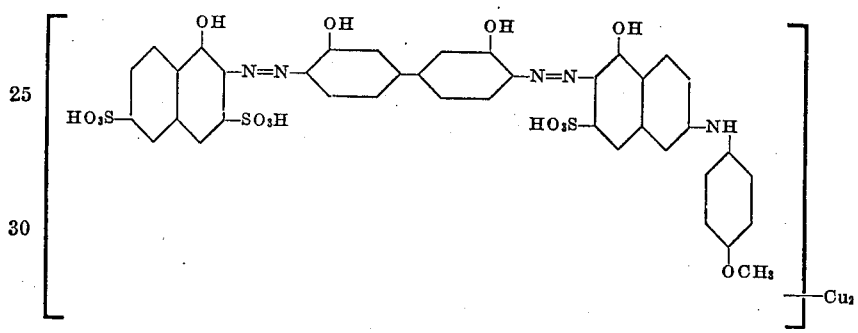

is then filtered, dissolved in hot water, rendered alkaline by means of sodium carbonate, filtered, salted out from the filtrate and filtered. After drying a black powder is obtained, which dissolves in water with a blue coloration and dyes cotton, silk and viscose artificial silk blue shades, very fast to light and fast to alkalies.

When coppering in the same manner the azo-dyestuff having in its free state the following formula:

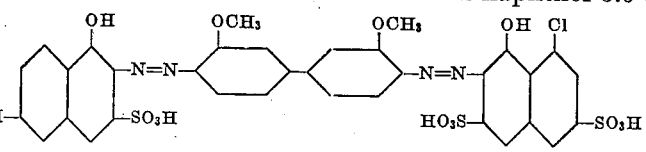

there is obtained a copper compound having the same properties.

*Example 2.*—One molecular proportion of the dyestuff obtained as described in Example 1 from one molecular proportion of 4.4'-diamino-3.3'-dimethoxydiphenyl, one molecular proportion of 1-hydroxy-8-ethoxynaphthalene-3.6-disulfonic acid and one molecular proportion of 2-phenylamino-5-hydroxynaphthalene-7-sulfonic acid is boiled under a reflux for a prolonged period with two molecular proportions of copper sulfate in aqueous solution rendered weakly acid to Congo, until the shade no longer changes.

The working up then follows as in Example 1. A black powder is thus obtained which dissolves in water with a blue coloration and which dyes cotton, silk and viscose artificial silk blue shades, fast to light. In its free state the dyestuff has the probable formula:

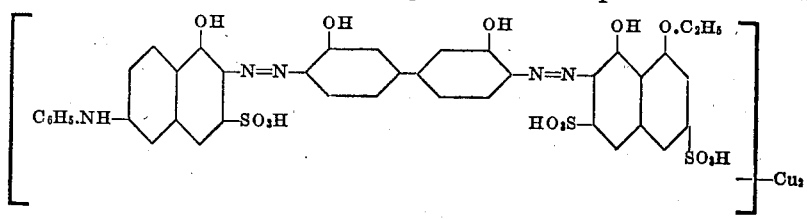

When coppering in the same manner the azo-dyestuff having in its free state the following formula:

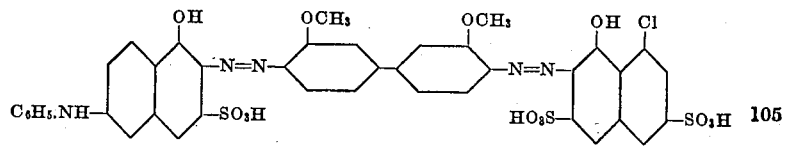

there is obtained a copper compound having the same properties.

*Example 3.*—One molecular proportion of the disazodyestuff obtained as described in Example 1 from one molecular proportion of tetrazotized 4.4'-diamino-3.3'-dimethoxydiphenyl, one molecular proportion of 8-chloro-1-naphthol-3.6-disulfonic acid and one molecular proportion of 2-benzoylamino-5-hydroxynaphthalene 7-sulfonic acid is heated for about 2 hours in aqueous ammoniacal solution with 2¼ molecular proportions of tetramine cupric sulfate in the presence of free ammonia at a temperature of 70–80° C. The copper containing dyestuff thus obtained dyes cotton and viscose reddish-blue shades fast to light. In its free state it has the probable formula:

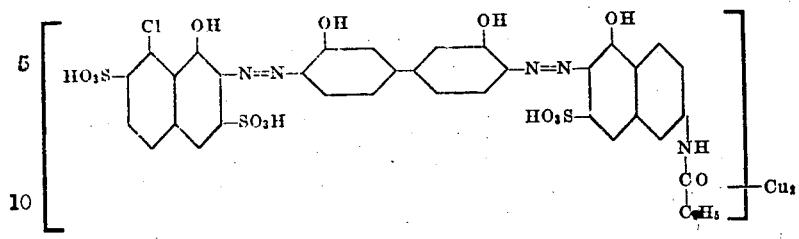

We claim:
1. The process which comprises heating a water soluble salt of an azodyestuff of the general formula:

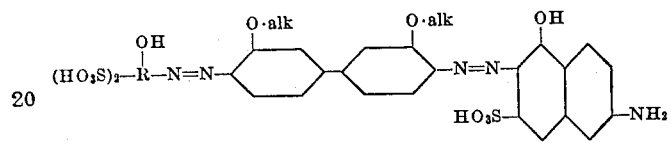

wherein R stands for a naphthalene nucleus in which the hydroxy group stands in o-position to the azo bridge, "alk" stands for an alkyl group and wherein all nuclei may be further substituted by substituents of the group consisting of halogen, alkyl, oxalkyl, alkyloxy, the nitro group, the sulfonic acid group, the carboxylic acid group, the hydroxy group, and the amino group may be substituted by acyl or a hydrocarbon radical, in aqueous solution with a compound of di-valent copper, yielding copper, until the shade of the dyestuff no longer changes.

2. The process which comprises heating one molecular proportion of an alkali metal salt of an azo-dyestuff of the general formula:

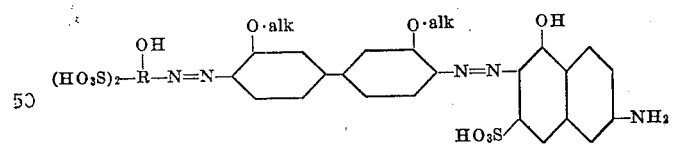

wherein R stands for a naphthalene nucleus in which the hydroxy group stands in o-position to the azo bridge, "alk" stands for an alkyl group and wherein all nuclei may be further substituted by substituents of the group consisting of halogen, alkyl, oxalkyl, alkyloxy, the nitro group, the sulfonic acid group, the carboxylic acid group, the hydroxy group, and the amino group may be substituted by acyl or a hydrocarbon radical, in aqueous solution with two molecular portions of a compound of di-valent copper, yielding copper at 60–175° C., until the shade of the dyestuff no longer changes.

3. The process which comprises heating one molecular proportion of the sodium salt of the dyestuff:

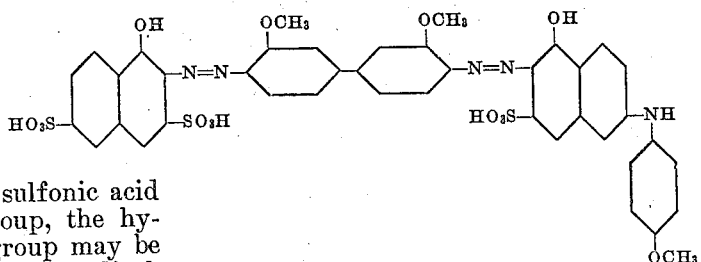

in weak aqueous acid solution with the addition of two molecular proportions of copper sulfate at a temperature of 110–115° C., until the shade of the dyestuff no longer changes.

4. The process which comprises boiling one molecular proportion of an alkali metal salt of the dyestuff:

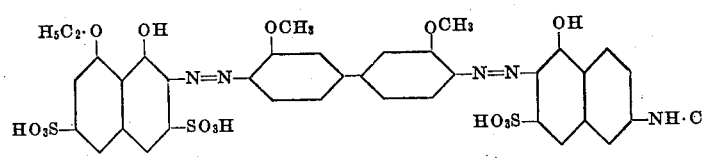

in aqueous solution reacting weakly acid containing two molecular proportions of copper sulfate, until the shade of the dyestuff no longer changes.

5. The process which comprises heating one molecular proportion of the sodium salt of the dyestuff:

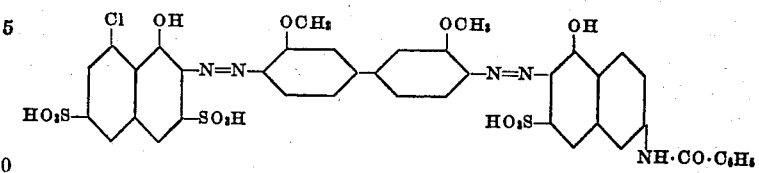

for about 2 hours in aqueous ammoniacal solution containing 2¼ molecular proportions of tetrammine cupric sulfate and a small quantity of free ammonia at a temperature of 70–80° C.

6. As new products copper containing azo-compounds of the probable general formula:

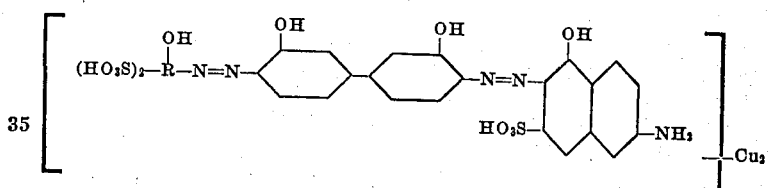

wherein R stands for a naphthalene nucleus in which the hydroxy group stands in o-position to the azo bridge, and wherein all nuclei may be further substituted by substituents of the group consisting of halogen, alkyl, oxalkyl, alkyloxy, the nitro group, the sulfonic acid group, the carboxylic acid group, the hydroxy group, and the amino group may be substituted by acyl or a hydrocarbon radical, being in form of their alkali metal salts generally dark powders, soluble in water with a blue coloration and dyeing cotton blue to violet shades of good fastness properties.

7. As a new product a copper containing azo-compound of the formula:

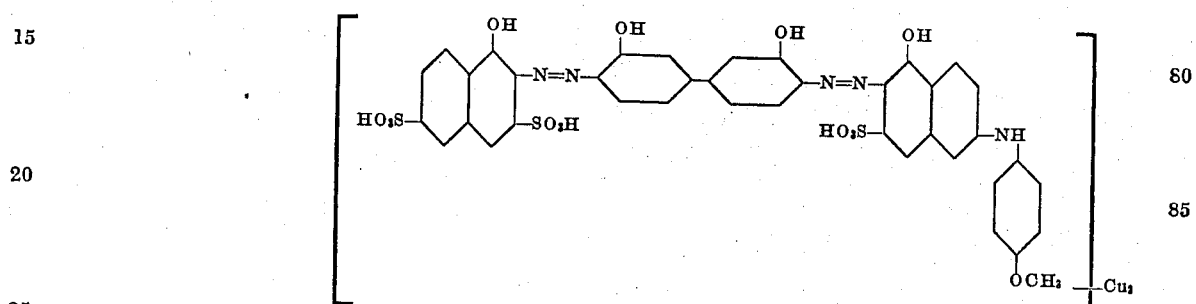

being a black powder, soluble in water with a blue coloration and dyeing cotton, silk and viscose artificial silk blue shades, very fast to light and fast to alkalies.

8. As a new product a copper containing azo-compound of the probable formula:

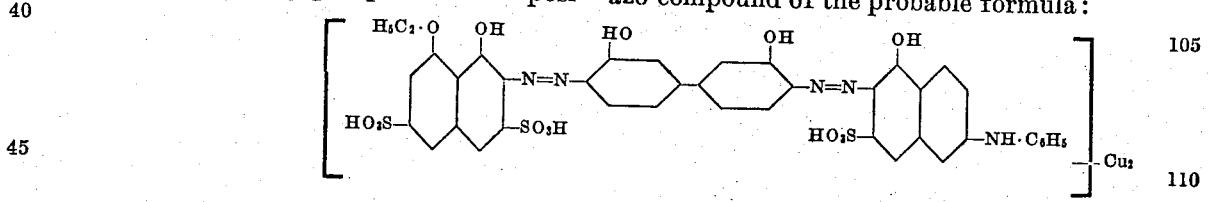

being a black powder, soluble in water, dyeing cotton, silk and viscose artificial silk blue shades, fast to light.

9. As a new product a copper containing azo-compound of the formula:

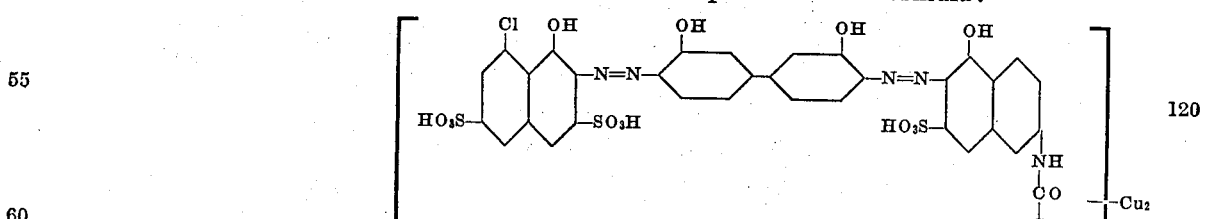

being a dark powder and dyeing cotton and viscose reddish-blue shades fast to light.

In testimony whereof, we affix our signatures.

RICHARD STÜSSER.
KARL WIEDEMANN.